United States Patent [19]

Körner et al.

[11] Patent Number: 6,090,904
[45] Date of Patent: Jul. 18, 2000

[54] SILICONE COMPOSITIONS CURABLE IN PRESENCE OF MOISTURE

[75] Inventors: Dieter Körner, Oberboihingen; Dieter Müller, Neuffen, both of Germany

[73] Assignee: ARA Werk Kramer GmbH, Unterensigngen, Germany

[21] Appl. No.: 09/063,126

[22] Filed: Apr. 20, 1998

Related U.S. Application Data

[63] Continuation of application No. 08/769,977, Dec. 19, 1996, abandoned.

[51] Int. Cl.[7] .................................................. C08G 77/16
[52] U.S. Cl. .............................. 528/34; 524/864; 528/28; 523/102
[58] Field of Search ........................ 528/28, 34; 523/102; 524/864

[56] References Cited

U.S. PATENT DOCUMENTS

| | | | |
|---|---|---|---|
| 4,221,896 | 9/1980 | Endo | 528/28 |
| 4,302,571 | 11/1981 | Arai et al. | 528/32 |
| 4,495,331 | 1/1985 | Chung | 524/783 |
| 4,537,944 | 8/1985 | Imai et al. | 528/18 |
| 4,552,919 | 11/1985 | Mikami et al. | 524/860 |
| 4,797,439 | 1/1989 | Peccoux | 524/188 |
| 5,036,125 | 7/1991 | Perrin | 524/405 |
| 5,274,154 | 12/1993 | Roth et al. | 556/401 |

FOREIGN PATENT DOCUMENTS

| | | |
|---|---|---|
| 131446 | 1/1985 | European Pat. Off. . |
| 05 79 232 A1 | 7/1993 | European Pat. Off. . |
| 0 690 100 A2 | 6/1995 | European Pat. Off. . |
| 39 03 337 A1 | 8/1990 | Germany . |
| 08073745 | 3/1996 | Japan . |

OTHER PUBLICATIONS

Abstract, JP 8073745, Mar. 19, 1996.

*Primary Examiner*—Margaret G. Moore
*Attorney, Agent, or Firm*—Killworth, Gottman, Hagan & Schaeff LLP

[57] ABSTRACT

Compositions and methods of making them are described and claimed which comprise a polymeric material having not less than two groups bonded to silicon which are hydroxyl or hydrolysable groups, a silane cross-linking agent having at least two oximo groups which are reactive with said polymeric material in presence of moisture to release an oxime condensation by-product and a component effective to control emission of volatile oxime compounds from the composition as it cures. The component effective to control emission of volatile oxime compounds from the composition as it cures is preferably an organic isocyanate having at least one isocyanate group and is preferably present in a stoichiometric ratio with the proportion of condensation by-product to be evolved. The polymeric material is preferably according to the general formula X-A-X where A represents a polyoxyalkylene chain or a polydiorganosiloxane chain and X represents a hydroxyl or hydrolysable group selected form $-R''_2SiCH$, $-R''Si(OR^5)_2$, $-Si(OR^5)_3$, $-R''_2SiOR^5$ or $-R''_2SiR'''SiR''_p(OR^5)_{3-p}$ where R'' represents an alkyl or fluoroalkyl group, and is preferably methyl, R''' is a divalent hydrocarbon group which may be interrupted by one or more siloxane spacers having up to six silicon atoms, $R^5$ represents an alkyl or oxyalkyl group in which the alkyl groups have up to 6 carbon atoms and p has the value 0, 1 or 2.

14 Claims, 2 Drawing Sheets

SILICONE COMPOSITIONS CURABLE IN PRESENCE OF MOISTURE

CROSS-REFERENCE TO RELATED APPLICATION

This is a continuation of application Ser. No. 08/769,977, filed Dec. 19, 1996, now abandoned.

This invention is concerned with silicone compositions curable in presence of moisture and also relates to their use as sealing materials.

Typically, such compositions are curable by crosslinking at room temperature in presence of moisture and contain a crosslinking agent which forms a condensation by-product during crosslinking. Crosslinking systems of single-component or multi-component silicone compositions of this type are frequently used as sealing materials or as binders.

The present invention is particularly concerned with silicone compositions obtained by mixing a polymeric material having reactive terminal groups, generally silanol groups, with a crosslinking agent for the polymeric material which is a silane having at least two oximo groups per molecule. During the preparation of the composition by compounding its ingredients, silanol and moisture contained in the formulation raw materials, for example in the polymeric material or in the inorganic filler such as silica or calcium carbonate, or atmospheric moisture react to generate a condensation by-product, for example methyl ethyl ketoxime. The condensation by-products, provided that they are volatile, are emitted slowly at the surface of the curing or cured silicone composition by diffusion and are volatilised there. The volatilising condensation products may lead to shrinkage of the cured material which may be regarded as aesthetically undesirable and technically undesirable if, for example, it results in a loss of adhesion on a substrate to which it has been applied. Furthermore, escaping materials may cause a nasal nuisance or may even be damaging to health.

It is one object of the present invention to control emission of volatile oxime compounds from a silicone composition in which the curative employed is an oximo silane as it cures. This control may manifest itself in prevention of such emission or by depression of the rate of emission over a prolonged period.

Surprisingly we have now found that the rate at which condensation by-products are emitted from silicone compositions in which the curative employed is an oximo silane appears to be significantly reduced or even prevented if there is included in the composition a reactive component, for example an organic isocyanate, reactive with the oxime condensation by-product.

The present invention provides in one of its aspects a composition capable of curing at room temperature in presence of atmospheric moisture which has been formed by mixing materials comprising a polymeric material having not less than two groups bonded to silicon which are hydroxyl or hydrolysable groups, a silane crosslinking agent having at least two oximo groups which are reactive with said polymeric material in presence of moisture to release an oxime condensation by-product characterised in that the materials include a component effective to control emission of volatile oxime compounds from the composition as it cures.

Without wishing to be bound by any particular theory, the applicant believes that the beneficial results achieved with this invention are brought about by chemical reaction of the oxime condensation by-product or products with the component effective to control emission, for example an organic isocyanate at least substantially as soon as the oxime condensation by-products are produced and so to convert them to products which remain in the silicone composition. In other words the silicone composition contains a component which reacts with the condensation by-product whereby to capture it and reduce the opportunity for it to be released from the composition.

Also included within the scope of this invention are the cured elastomeric products of the said compositions and the use of such compositions for sealing joints, cavities and the like.

In a composition according to the invention, the polymeric material may be according to the general formula X-A-X wherein A may be any desired organic or siloxane molecular chain for example a polyoxyalkylene chain or more preferably a polydiorgano-siloxane chain and thus preferably includes siloxane units $R''_s SiO_{4-s/2}$ in which $R''$ represents an alkyl group having from 1 to 6 carbon atoms, for example a methyl group, a vinyl group or a phenyl group, or fluorinated alkyl group and s has a value of 0, 1 or 2. Preferred materials are linear materials i.e. s=2 for all units. Preferred materials have polydiorgano-siloxane chains according to the general formula $-(R''_2SiO)_t-$ in which each $R''$ represents a methyl group and t has a value from about 200 to about 1500. Suitable materials have viscosities of the order of about 500 mPa.s to about 200,000 mPa.s. The groups X of the polymeric materials are hydroxyl or hydrolysable groups and may be selected, for example, form $-R''_2SiOH$, $-R''Si(OR^5)_2$, $-Si(OR^5)_3$, $-R''_2SiOR^5$ or $-R''_2SiR'''SiT''_p(OR^5)_{3-p}$ where $R''$ is aforesaid, and is preferably methyl, $R'''$ is a divalent hydrocarbon group which may be interrupted by one or more siloxane spacers having up to six silicon atoms, $R^5$ represents an alkyl or oxyalkyl group in which the alkyl groups have up to 6 carbon atoms and p has the value 0, 1 or 2.

Preferred polymeric materials are thus polydiorganosiloxanes having terminal, silicon-bound hydroxyl groups or terminal, silicon-bound organic radicals which can be hydrolysed using moisture, wherein these polydiorganosiloxanes preferably have a viscosity of 0.2 to 300 Pa.s at 25° C. The polydiorganosiloxanes may be homopolymers or copolymers. Mixtures of different polydiorganosiloxanes having terminal condensable groups are also suitable.

The said condensable polydiorganosiloxanes preferably have an average viscosity of 10 to 100 Pa.s at 25° C. The organic radical is advantageously a hydrocarbon radical or halogenated hydrocarbon radical having 1 to 10 carbon atoms. Examples of radicals of this type are methyl, ethyl, propyl, butyl, phenyl, vinyl, alkyl, cyclohexyl, tolyl and isopropyl. Examples of halogenated hydrocarbon radicals are chloropropyl, 3,3,3-trifluoropropyl, chlorophenyl, beta-(perfluorobutyl) ethyl and chlorocyclohexyl. The organic radicals are preferably the methyl radical.

In a composition according to the invention the silane curative may be a silane having two or more and preferably three oximo groups, any remaining groups being for example methyl, ethyl or vinyl. Examples of operative oximo silanes are methyl tri ethyl ketoximo silane, vinyl tri methyl ethyl ketoxime silane, tetra methyl ethyl ketoximo silane.

In a composition according to the invention, the component effective to control emission of volatile compounds (an oxime capturing substance) is preferably an organic isocyanate. In principle, aromatic isocyanates, such as diphenylmethane diisocyanate (MDI) are suitable. However, aliphatic isocyanates have the advantage compared to aromatic isocyanates that they are more resistant to light, so that a yellow coloration, which is undesirable in many cases, is avoided. The polyisocyanates, particularly diisocyanates are preferred because they react somewhat slower compared to monoisocyanates, as is required in the present case in accordance with the slowly advancing crosslinking process. The isocyanates may also be present in the form of polyurethane prepolymers.

Surprisingly, it has been shown that the isocyanates in the silicone compositions do not impair stability of the compositions as long as air and moisture are excluded from them. However, when the oxime condensation by-products are released during crosslinking, reactions known in polyurethane chemistry take place because of the relative reactivity of the isocyanates with the oxime condensation by-products.

In principle, the quantity of added oxime capturing substance, particularly isocyanate, can be freely selected. Of course it must be enough to capture the oxime condensation by-product to an adequate extent, preferably to bring the condensation in the crosslinked product below a certain limiting value which is acceptable from a regulation or toxicological point of view. The isocyanate is present in the composition in the preferred embodiments essentially in a stoichiometric ratio with the quantity of crosslinker or condensation by-product to be bound or in a proportion which decreases the amount of releasable free oxime below the limiting value. If present in adequate quantity the isocyanate reacts with the oxime condensation by-product being released, during preparation of the silicone composition and subsequent storage with exclusion of moisture, and furthermore reacts with the oxime condensation by-product released by crosslinking.

The isocyanate is usually present in the composition in a quantity of 0.05 to 10 wt. %, preferably a quantity of 2 to 7 wt. %, in particular about 5 wt. %, based on the total weight of the composition. The percentage portion is thus dependent not only on the quantity of the crosslinker or condensation by-product, but also on the content of fillers in the composition and on the molecular weight of the isocyanate. Hence it is understandable that lower quantities by weight are adequate for smaller isocyanates than for isocyanate prepolymers which have a relatively low proportion of isocyanate groups. Examples of suitable aliphatic diisocyanates which can be used, particularly for those compositions in which methylethylketoxime (MEKO) is produced as oxime condensation by-product, are hexamethylene diisocyanate (HDI), isophorone diisocyanate (IPDI), trimethylene diisocyanate (TMDI) and tetramethylxylene diisocyanate (TMXDI). Both primary and secondary isocyanates are suitable.

As already mentioned above, the storage stability of the systems is not disadvantageously impaired by the inclusion of isocyanates. Interestingly, the viscosity is somewhat increased by the addition of isocyanate. This has the advantage that the proportion of pyrogenic silicic acid may be reduced. Silicone compositions according to the invention may be prepared in a manner known per se, but it is important that the isocyanate is mixed in after the other components have already been mixed with one another. Thus, a process for preparing preferred compositions according to the invention comprises mixing under at least substantially anhydrous conditions the polymeric material having not less than two groups bonded to silicon which are hydroxyl or hydrolysable groups, the silane crosslinking agent having at lease two oximo groups which are reactive with said polymeric material in presence of moisture to release an oxime condensation by-product and finely divided filler and thereafter adding to the mixture so formed the organic isocyanate effective to control emission of volatile oxime compounds from the composition as it cures. After mixing, the compositions should be stored under substantially anhydrous conditions, for example in sealed containers, until required for use.

The present invention provides in another of its aspects a method of controlling the emission of volatile by-product oxime produced by a composition capable of curing at room temperature in presence of atmospheric moisture which has been formed by mixing materials comprising a polymeric material having not less than two groups bonded to silicon which are hydroxyl or hydrolysable groups, a silane crosslinking agent having at least two oximo groups which are reactive with said polymeric material in presence of moisture to release an oxime condensation by-product which method comprises the step of including in the composition a component effective to control emission of volatile oxime compounds from the composition as it cures.

The oxime condensation by-products, which are usually volatile, are chemically captured due to the addition of, for example isocyanate, and bound in the system. Oximes, such as methylethylketoxime (MEKO) are regarded as damaging to health and a nasal nuisance. Since the condensation by-products remain in the cured compositions according to the present invention, emission of oximes and volume reductions are reduced or avoided. In addition, it has been noted, that isocyanates when present also favourably influence mechanical properties of the crosslinked compositions. Hence the elongation at break increases with increasing isocyanate content.

The addition according to the invention of a component reacting with the oxime condensation by-product is particularly preferred for RTV systems with crosslinkers based on oximosilanes for the reasons mentioned above. Those oximosilanes which form methylethylketoxime (MEKO) as oxime condensation by-product are mainly used in systems of this type. As a result of suitable selection of the components reacting with the oxime condensation by-products, particularly the isocyanates, they may be substantially adapted as regards the reactivity of the release rate of MEKO. Mixtures of components capturing the oxime condensation by-products may also be provided, particularly mixtures of isocyanates.

Compositions of this invention may contain a silica such as high surface area fume or precipitated silica and may also contain as optional constituents other ingredients which are conventional to the formulation of silicone rubber sealants and the like. For example, the compositions will normally contain one or more other finely divided, reinforcing or extending fillers such as crushed quartz, diatomaceous earth, calcium carbonate, magnesium carbonate, zinc carbonate, barium sulphate, iron oxide, titanium dioxide and carbon black. The proportion of such fillers employed will depend on the properties desired in the elastomer-forming composition and the cured elastomer. Usually the filler content of the composition will reside within the range from about 5 to about 150 parts by weight per 100 parts by weight of the polymeric material.

Other ingredients which may be included in the compositions are catalysts and co-catalysts for increasing the rate of cure of the composition, pigments, plasticisers, agents (usually organosilicon compounds) for treating fillers, rheological additives for improving toolability of the composition and adhesion improving substances for example γ-aminopropyl triethoxysilane. Suitable catalysts are titanium compounds, for example tetra isopropyl titante and tetra-n-butyl titanate.

Co-catalysts are well known in the art and include the metal salts of carboxylic acids, for example lead octoate and dibutyltin dilaurate, dibutyltin diacetate and stannous octoate. If a more rapid cure is desired, a chelate, for example an acetyl acetonante, may be added to the mixture. Those acetyl acetonate materials conventionally used as accelerators for titanium catalysts may be employed, for example ethyl aceto acetate and methyl aceto acetate. Another conventional ingredient which can be employed as a plasticiser and to reduce the modulus of the cured elastomer is a polydimethylsiloxane having terminal triorganosiloxy groups wherein the organic substituents are e.g. methyl, vinyl or phenyl or combinations of these groups. Such polydimethylsiloxanes normally have a viscosity of from about 100 to about 100,000 mPa.s at 25° C. and can be employed in amounts up to about 80 parts per 100 parts by weight of the polymeric material.

Compositions according to the invention may be formulated as single part formulations which are stable in storage and cure on exposure to atmospheric moisture and may be employed in a variety of applications, for example as coating, caulking and encapsulating materials. They are, however, particularly suitable for sealing joints are subject to relative movement. They are thus particularly suitable as glazing sealants and for sealing building structures. They have desired cure properties to provide cured seals having a modulus sufficiently low for most industry standards and elongation to break which is sufficiently high for most industry standards.

In order that the invention may become more clear there now follows a detailed description of Examples selected for description to illustrate the invention and with reference to the drawings. In the Examples, all parts are by weight and all viscosities are at 25° C. unless the context otherwise requires.

EXAMPLE 1

Figure 1:
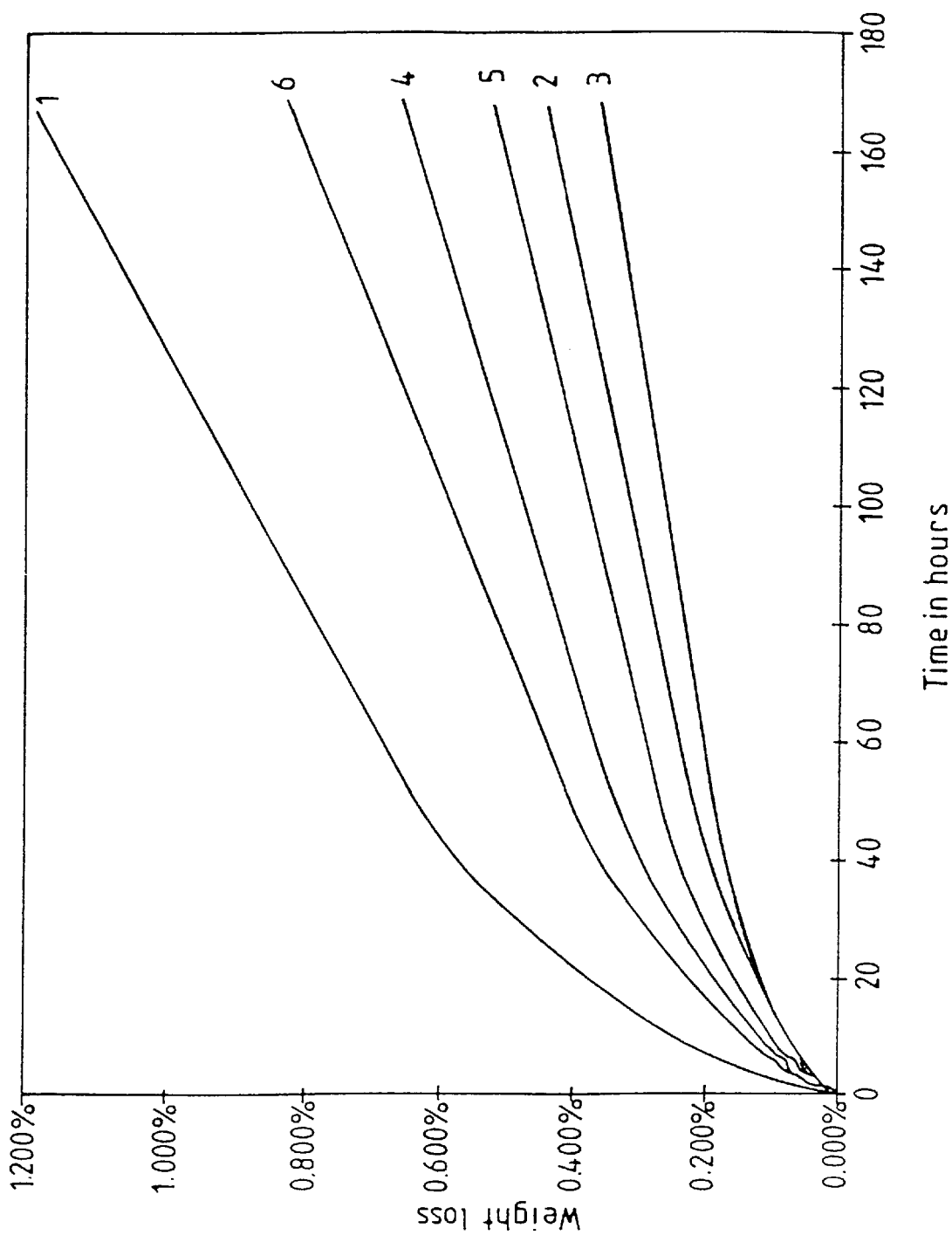
FIG. 1 is a Table showing weight loss with respect to cure time of compositions with and without 2.5 weight % of various isocyanates.

A basic recipe for a composition according to the invention was prepared by mixing the following components at room temperature with exclusion of moisture:

| Parts | Component |
| --- | --- |
| 100 | Commercially available polydimethyl-siloxane with terminal SiOH groups (viscosity 80 Pa.s), |
| 10 | methyltri(mehylethyl-ketoximosilane), |
| 50 | trimethylsilyl-end blocked polydimethyl-siloxane 0.1 Pa.s (silicone plasticiser) pyrogenic silicic acid (surface area 150 m²/g) |
| 120 | stearate treated calcium carbonate |
| 2 | γ-aminopropyl-triethoxysilane (adhesion promoter) |
| 0.2 | dibutyl tin dilaurate (catalyst) |

2.5 parts or 5 parts (i.e. 2.5 weight % and 5 weight % respectively) of hexamethylene diisocyanate (HDI) prepolymer (Desmodur N 100 supplied by Bayer) were added to 100 g of this basic recipe to prepare two silicone compositions according to the invention and mixed with exclusion of moisture.

The volatile reaction products present in the resulting formulation were determined by means of collection in a head space device and subsequent analysis by GC/MS (standardised gas chromatography/mass spectroscopy). The volatile reaction products present in silicone composition according to the basic recipe without isocyanate were determined in the same manner as a comparison.

The relative content of oxime measured, in the present case methylethylketoxime (MEKO), is shown as follows:

|  | 100 parts basic recipe without HDI prepolymer | 100 parts basic recipe plus 2.5 parts HDI prepolymer | 100 parts basic recipe plus 5 parts HDI prepolymer |
| --- | --- | --- | --- |
| MEKO content | 7.6 | 1.9 | 0 |

EXAMPLE 2

The three formulations according to Example 1 were analysed once again after allowing the samples to be exposed to moisture and so start the crosslinking process in the presence of moisture. The volatile products, which were formed during a 16-hour crosslinking time, were collected in a small glass bottle and analysed in turn by standardised GC/MS using a head-space device.

The values for the relative content of MEKO are shown as follows:

|  | 100 parts basic recipe without HDI prepolymer | 100 parts basic recipe plus 2.5 parts HDI prepolymer | 100 parts basic recipe plus 5 parts HDI prepolymer |
| --- | --- | --- | --- |
| MEKO content | 17.5 | 10.8 | 7.0 |

The weight loss of the three formulations during crosslinking was likewise determined. The following table summarises the inclusion of isocyanate addition to reduction in weight loss.

| Cross linking time (hours | 100 parts basic recipe without HDI prepolymer | 100 parts basic recipe plus 2.5 parts prepolymer | 100 parts basic recipe plus 5 parts HDI prepolymer |
| --- | --- | --- | --- |
| | Weight loss (%) | | |
| 2 | 0.07 | 0.04 | 0.02 |
| 4 | 0.14 | 0.07 | 0.03 |
| 6 | 0.18 | 0.08 | 0.04 |
| 24 | 0.42 | 0.21 | 0.09 |
| 48 | 0.62 | 0.33 | 0.16 |
| 200 | 1.18 | 0.65 | 0.33 |

Crosslinking led to a dry, non-sticky surface for all three formulations and the result was materials having a low modulus of elasticity. No effect of the isocyanate addition on crosslinking or the design of the cure was seen.

EXAMPLE 3

Different diisocyanates were added to 100 parts of the basic recipe according to Example 1 in quantities of 2.5 parts and 5 parts (2.5 wt. % and 5 wt. % respectively). These diisocyanates were para-tetra-methylxylol diisocyanate (TMXDI), isophorone diisocyanate (IPDI) and diphenylmethane diisocyanate (MDI) as aromatic diisocyanate. In addition, tosyl isocyanate (TI) (p-toluene sulphonyl isocyanate) was used as monofunctional isocyanate.

The same tests were carried out on the silicone compositions obtained using the said isocyanates as with the silicone compositions according to Example 2.

Figure 2:
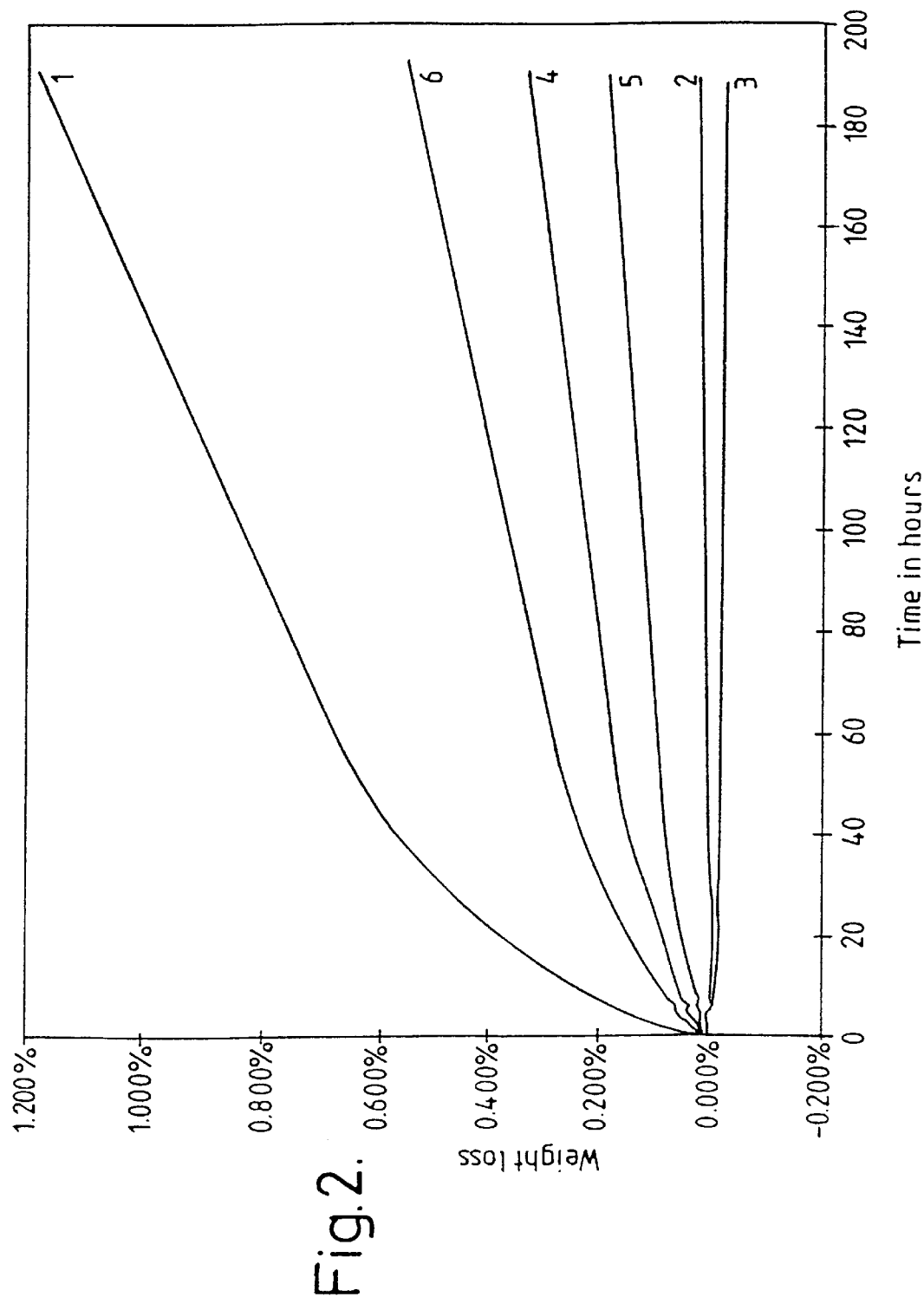
FIG. 2 is a Table showing weight loss with respect to cure time of compositions with and without 5 weight % of various isocyanates.

The outcome of the results from Examples 2 and 3 are shown in FIGS. 1 and 2. The numbers (curves) 1 to 6 there represent the following isocyanates.

| | |
|---|---|
| 1:0 (reference) | (Example 2) |
| 2:TMXDI | (Example 3) |
| 3:IPDI | (Example 3) |
| 4:HDI | (Example 2) |
| 5:MDI | (Example 3) |
| 6:TI | (Example 3) |

These diagrams clearly show that there is a significant reduction in weight loss in the case of addition of isocyanates. The results also show that the aliphatic diisocyanates have a more pronounced effect in the selected example than the aromatic diisocyanates used.

That which is claimed is:

1. A composition which cures in contact with atmospheric moisture at room temperature comprising a polymeric material having the general formula X-A-X, wherein A represents a polyoxyalkylene chain or a polydiorganosiloxane chain and X represents a silicon bonded hydroxyl group, A silane crosslinking agent having at least 2 oximo groups which, when in contact with atmospheric moisture, react with the silicon bonded hydroxyl groups on the polymeric material to cure the material and release a volatile oxime condensation by-product; and an organic di-isocyanate selected from the group consisting of aliphatic di-isocyanates and diphenylmethane di-isocyanate which reacts with the volatile oxime condensation by-product to control its emission from the composition as it cures.

2. A composition according to claim 1 wherein the material which reacts with the volatile oxime condensation by-product to control its emission from the composition as it cures is present in a stoichiometric ratio with the proportion of volatile oxime condensation by-product to be released.

3. A composition according to claim 1 wherein A represents —(R"$_2$SiO)$_t$—, wherein each R" represents a methyl group and t has a value from about 200 to about 1500.

4. A cured product formed by contacting the composition according to claim 1 with atmospheric moisture at room temperature.

5. A composition according to claim 1 which further includes at least one material selected from the group consisting of fillers, catalysts, co-catalysts, pigments, plasticisers, agents for treating fillers, rheological additives for improving tollability of the composition and adhesion improving substances.

6. A cured product formed by contacting the composition according to claim 5 with atmospheric moisture at room temperature.

7. A method for controlling the emission of volatile oxime condensation by-product released upon curing of a composition in contact with atmospheric moisture at room temperature, said composition comprising a polymeric material having the general formula X-A-X wherein A represents a polyoxyalkylene or a polydiorganosiloxane chain and X represents a silicon bonded hydroxyl group, and a silane crosslinking agent having at least 2 oximo groups which, when in contact with atmospheric moisture, react with the silicon bonded hydroxyl groups on the polymeric material to cure the material and release a volatile oxime condensation by-product, which method comprises including in the composition an organic di-isocyanate selected from the group consisting of aliphatic di-isocyanates and diphenylmethane di-isocyanate which reacts with the volatile oxime condensation by-product to control its emission from the composition as it cures.

8. A method according to claim 7 wherein the material which reacts with the volatile oxime condensation by-product to control its emission form the composition as it cures is present in a stoichiometric ratio with the proportion of volatile oxime condensation by-product to be released.

9. A method for controlling the emission of volatile oxime condensation by-product released upon curing of a composition in contact with atmospheric moisture at room temperature, said composition comprising of a polymeric material having the general formula X-A-X, wherein A represents a polyoxyalkylene chain or a polydiorganosiloxane chain and X represents a silicon bonded hydroxyl group, a silane crosslinking agent having at least 2 oximo groups which, when in contact with atmospheric moisture, react with the silicon bonded hydroxyl groups on the polymeric material to cure the material and release a volatile oxime condensation by-product, and at least one material selected from the group consisting of fillers, catalysts, co-catalysts, pigments, plasticisers, agents for treating fillers, rheological additives for improving toolability of the composition and adhesion improving substances, which method comprises including in the composition an organic di-isocyanate selected from the group consisting of aliphatic di-isocyanates and diphenylmethane di-isocyanate which reacts with the volatile oxime condensation by-product to control its emission from the composition as it cures.

10. A process for preparing a composition which cures in contact with atmospheric moisture at room temperature comprising:

mixing under at least substantially anhydrous conditions a polymeric material having not less than 2 silicon bonded hydroxyl groups or hydrolysable groups per molecule, a silane crosslinking agent having at least 2 oximo groups which, when in contact with atmospheric moisture, react with silicon bonded hydroxyl groups or hydrolysable groups on the polymeric material to cure the material and release a volatile oxime condensation by-product and a finely divided filler to form a first mixture; and adding to the first mixture an organic di-isocyanate selected from the group consisting of aliphatic di-isocyanates and diphenylmethane di-isocyanate which reacts with the volatile oxime condensation by-product to control its emission from the composition as it cures to form the final composition.

11. A process according to claim 10 wherein the composition is charged into sealed containers for storage until required for use.

12. A process according to claim 11 wherein the material which reacts with the volatile oxime condensation by-product to control its emission from the composition as it cures is present in a stoichiometric ratio with the proportion of volatile oxime condensation by-product to be released.

13. A process for preparing a composition which cures in contact with atmospheric moisture at room temperature comprising:

mixing under at least substantially anhydrous conditions a polymeric material having not less than 2 silicon bonded hydroxyl groups per molecule, a silane crosslinking agent having at least 2 oximo groups which, when in contact with atmospheric moisture, react with the silicon bonded hydroxyl groups or hydrolysable groups on the polymeric material to cure the material and release a volatile oxime condensation by-product and at least one material selected from the group consisting of fillers, catalysts, co-catalysts, pigments, plasticisers, agents for treating fillers, rheological additives for improving toolability of the composition and adhesion improving substances to form a first mixture; and adding to the first mixture an organic di-isocyanate selected from the group consisting of aliphatic di-isocyanates and diphenylmethane di-isocyanate which reacts with the volatile oxime condensation by-product to control its emission from the composition as it cures to form the final composition.

14. A composition according to claim 1 wherein the organic di-isocyanate is an aliphatic di-isocyanate selected from the group consisting of hexamethylene diisocyanate, isophorone diisocyanate and trimethylene diisocyanate.

* * * * *

UNITED STATES PATENT AND TRADEMARK OFFICE
CERTIFICATE OF CORRECTION

PATENT NO.    : 6,090,904
DATED         : July 18, 2000
INVENTOR(S)   : Komer et al.

It is certified that error appears in the above-identified patent and that said Letters Patent is hereby corrected as shown below:

Claim 5, column 7,
Line 61, "tollability" should be -- toolability --.

Claim 13, column 9,
Line 9, "hydroxyl groups per molecule" should be -- hydroxyl groups or hydrolysable groups per molecule --.

Signed and Sealed this

Twenty-third Day of October, 2001

Attest:

NICHOLAS P. GODICI
Attesting Officer    Acting Director of the United States Patent and Trademark Office